United States Patent
Brdiczka et al.

(10) Patent No.: US 12,189,919 B2
(45) Date of Patent: Jan. 7, 2025

(54) USER INTERFACE FOR EDITING OF A COMPOSITE DOCUMENT THROUGH INTELLIGENTLY ZOOMED PREVIEWS

(71) Applicant: Adobe Inc., San Jose, CA (US)

(72) Inventors: Oliver Brdiczka, San Jose, CA (US); Nipun Jindal, Delhi (IN); Kushith Amerasinghe, Santa Rosa, CA (US); Gabriel Boroghina, Olt (RO); Dan-Gabriel Ghita, Olt (RO); Cristian-Catalin Buzoiu, Bucharest (RO); Arpit Mathur, San Jose, CA (US); Aliakbar Darabi, Newcastle, WA (US); Alexandru Vasile Costin, Monte Sereno, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/737,452

(22) Filed: May 5, 2022

(65) Prior Publication Data
US 2023/0359325 A1    Nov. 9, 2023

(51) Int. Cl.
*G06F 17/00* (2019.01)
*G06F 3/0482* (2013.01)
(Continued)

(52) U.S. Cl.
CPC ........ *G06F 3/0482* (2013.01); *G06F 3/04847* (2013.01); *G06F 16/532* (2019.01);
(Continued)

(58) Field of Classification Search
CPC .. G06F 3/0482; G06F 3/04847; G06F 16/532; G06F 16/5846; G06F 16/5866;
(Continued)

(56) References Cited

U.S. PATENT DOCUMENTS 6,263,507 B1 * 7/2001 Ahmad ............... G06F 16/7834
725/38
8,560,529 B2 * 10/2013 Tunkelang .......... G06F 16/3331
707/738
(Continued)

OTHER PUBLICATIONS

Barnes, Connelly, et al., "Video Tapestries with Continuous Temporal Zoom", SIGGRAPH '10: ACM SIGGRAPH 2010 Papers, Article No. 89, Jul. 2010, pp. 1-8.
(Continued)

*Primary Examiner* — Laurie A Ries
(74) *Attorney, Agent, or Firm* — Kilpatrick Townsend & Stockton LLP

(57) ABSTRACT

An illustrator system accesses a multi-element document including a plurality of elements. The illustrator system selects, from the plurality of elements, a selected element. The illustrator system generates a replacement multi-element document that includes a substitute element in place of the selected element in the multi-element document, wherein the substitute element is different from the selected element. The illustrator system displays, via a user interface with the multi-element document, a preview of the replacement multi-element document providing a view of the replacement multi-element document, wherein the view of the replacement multi-element document is focused to depict the substitute element.

18 Claims, 8 Drawing Sheets

(51) Int. Cl.
*G06F 3/04847* (2022.01)
*G06F 16/532* (2019.01)
*G06F 16/58* (2019.01)
*G06F 16/583* (2019.01)

(52) U.S. Cl.
CPC ...... *G06F 16/5846* (2019.01); *G06F 16/5866* (2019.01); *G06F 2203/04806* (2013.01)

(58) Field of Classification Search
CPC ....... G06F 2203/04806; G06F 3/04845; G06F 3/04842
See application file for complete search history.

(56) References Cited

U.S. PATENT DOCUMENTS

| | | | | |
|---|---|---|---|---|
| 8,566,711 B1* | 10/2013 | Srivastava | ............ | G06F 40/197 715/273 |
| 9,449,080 B1 | 9/2016 | Zhang | | |
| 10,031,656 B1* | 7/2018 | Tseng | ............ | G06F 3/0485 |
| 11,902,651 B2* | 2/2024 | Paul | ............ | H04N 23/633 |
| 11,929,886 B2* | 3/2024 | A | ............ | H04L 41/0803 |
| 2009/0106674 A1* | 4/2009 | Bray | ............ | G06F 16/156 715/762 |
| 2011/0010350 A1* | 1/2011 | Bhogal | ............ | G06F 16/10 715/764 |
| 2013/0103389 A1* | 4/2013 | Gattani | ............ | G06F 40/295 704/9 |
| 2014/0380229 A1* | 12/2014 | Volodin | ............ | G06F 3/04842 715/780 |
| 2015/0178391 A1* | 6/2015 | Villaron | ............ | G06F 3/048 707/722 |
| 2016/0092405 A1* | 3/2016 | Lee | ............ | G06F 9/451 715/202 |
| 2016/0110316 A1* | 4/2016 | Carter | ............ | G06F 40/166 715/273 |
| 2016/0148407 A1* | 5/2016 | Hodges | ............ | H04L 69/22 382/309 |
| 2016/0246487 A1* | 8/2016 | Németh | ............ | G06T 3/20 |
| 2017/0199848 A1* | 7/2017 | Fein | ............ | G06F 16/93 |
| 2018/0032606 A1* | 2/2018 | Tolman | ............ | G06F 16/93 |
| 2019/0272328 A1* | 9/2019 | Dubyak | ............ | G06F 40/40 |
| 2020/0302110 A1* | 9/2020 | Agostino | ............ | G06F 16/735 |
| 2020/0372193 A1* | 11/2020 | Song | ............ | G06F 18/21 |
| 2021/0096729 A1* | 4/2021 | Dalonzo | ............ | H04M 1/72436 |
| 2021/0109958 A1 | 4/2021 | Behtash et al. | | |
| 2022/0043964 A1* | 2/2022 | Stenerson | ............ | G06F 3/0481 |
| 2022/0139041 A1 | 5/2022 | Li et al. | | |
| 2022/0319219 A1* | 10/2022 | Tsibulevskiy | ............ | G06V 30/226 |
| 2022/0414320 A1 | 12/2022 | Dolan et al. | | |

OTHER PUBLICATIONS

U.S. Appl. No. 17/583,818 , "Non-Final Office Action", Jan. 12, 2023, 18 pages.

* cited by examiner

USER INTERFACE FOR EDITING OF A COMPOSITE DOCUMENT THROUGH INTELLIGENTLY ZOOMED PREVIEWS

TECHNICAL FIELD

This disclosure generally relates to suggesting editing operations for composite or layered documents. More specifically, but not by way of limitation, this disclosure relates to systems for generation and suggestion of replacement composite documents.

BACKGROUND

Conventional document editing systems can suggest one or more editing operations to apply to a composite document and display the suggested editing operations in a user interface.

SUMMARY

The present disclosure describes techniques for using an illustrator system to generate previews of suggested replacement multi-element canvases that are zoomed to focus on a change to a specific element, according to certain embodiments disclosed herein. For example, an illustrator system determines a global intent for a multi-element document that includes a plurality of elements. The illustrator system determines the global intent based on the plurality of elements. The illustrator system selects an element from the plurality of elements. Based on the global intent, the illustrator system generates a replacement multi-element document that includes a substitute element in place of the selected element in the multi-element document. The substitute element is different from the selected element. The illustrator system displays a preview of the replacement multi-element document along with the multi element document in a user interface, providing a view of the replacement multi-element document. The view of the replacement multi-element document is focused to depict the substitute element.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
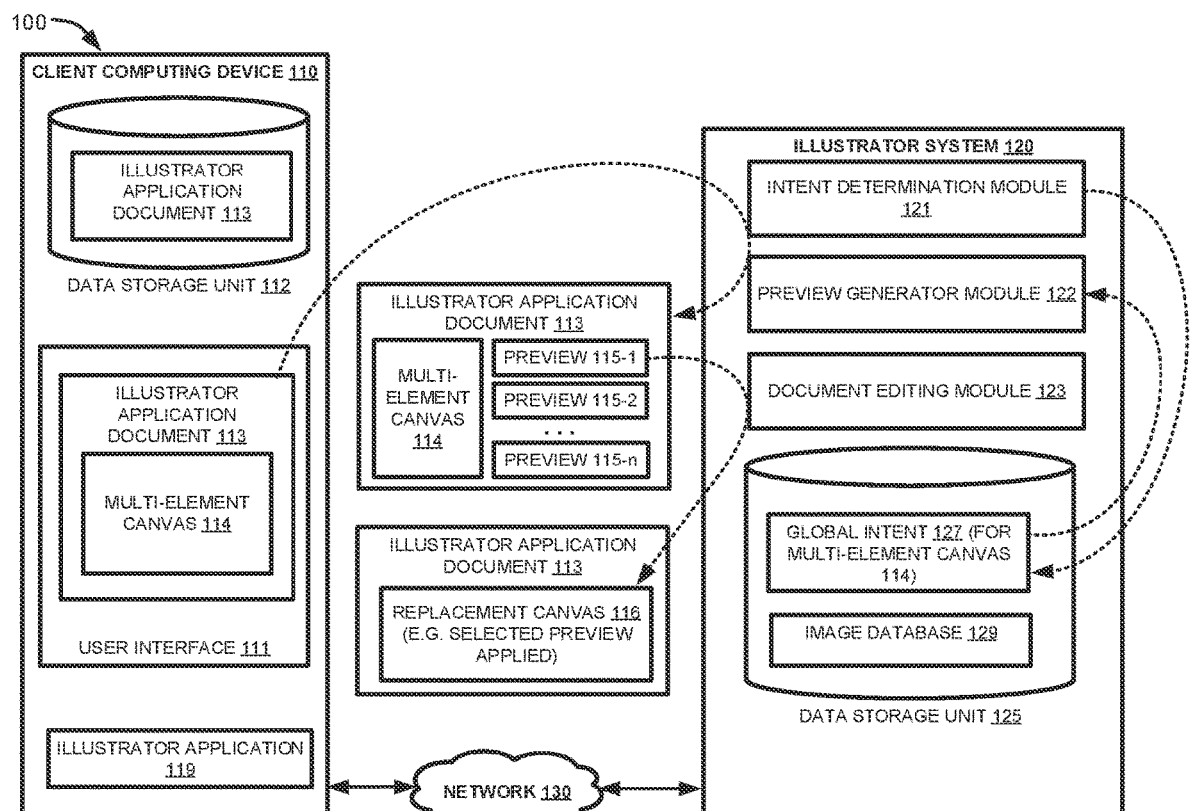
FIG. 1 depicts an example of a computing environment for generating previews of suggested replacement multi-element canvases that are zoomed to focus on a change to a specific element, according to certain embodiments disclosed herein.

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

Certain embodiments described herein address the limitations of conventional systems by providing a system to generate previews of suggested replacement multi-element canvases that are zoomed to focus on a change to a specific element, according to certain embodiments disclosed herein, wherein the preview can be used for modifying online computing environments or other systems. Certain embodiments described herein improve the performance of conventional illustrator systems by, for example, determining a global intent for a multi-element electronic document based on an element-specific intents of each element of the multi-element electronic document, which improves an accuracy of classification of a multi-element electronic document and improves an accuracy, usefulness, or relevancy of replacement multi-element documents, based on the classification. Further, certain embodiments described herein improve the performance and/or usability of user interfaces by, for example, providing a suggestive editing interface which reduces a number of inputs required to perform editing operations. For example, in some instances, the embodiments described herein automatically select an element of a multi-element canvas and provide previews of replacement canvases with suggested edits to the element without requiring a user interface input selecting the element. Further, the embodiments described herein can select an element of a multi-element canvas and provide previews of replacement canvases with suggested edits to the element based on an editing history of the user or based on an aggregate editing history of multiple users. Accordingly, in instances where users perform common and/or repetitive editing operations across multiple multi-element canvases, the techniques described herein can reduce the number of user interface inputs required by not requiring a user to manually select elements for editing and/or access multiple menu interfaces to select editing operations to apply to the selected elements.

The following non-limiting example is provided to introduce certain embodiments. In this example, an illustrator system accesses a multi-element document, for example, a multi-element canvas. The multi-element canvas is stored in a database accessible to the illustrator system. In some instances, the multi-element canvas is displayed on a user interface of a client device executing an illustrator application that communicates with the illustrator system via a network. For example, the illustrator application provides an illustrator application interface that enables viewing and editing of the multi-element canvas via the client device. The multi-element canvas includes a plurality of elements. In some instances the multi-element document is a layered document including a plurality of layers. Elements can include multiple image elements and/or text elements. Elements could include layers in the multi-element canvas. For example, the multi-element canvas could include a background layer, with a text layer in front of the background layer, and an image layer in front of the text layer. In some instances, elements further include edits made to the multi-element canvas, including an addition of an element, a deletion of an element, a duplication of an element, modifying one or more features of an element (e.g. size, orientation, font size, color, or other feature), or other edits to one or more elements in the multi-element canvas. In some instances, certain elements of the multi-element canvas partially or completely overlap or occlude other elements of the multi-element canvas. For example, an image element or layer partially or completely occlude a text element or layer, or vice versa.

The illustrator system determines a global intent for the multi-element canvas based on element-specific topic distributions determined for each element of the multi-element canvas. For example, the illustrator system determines an element-specific topic distribution for each element of the multi-element canvas. For text elements (e.g. extracted text, a text box, a text layer, or other text element), the illustrator system determines whether the text element includes text that is longer than a threshold length. For image elements (e.g. an image layer, an image object, a region of a multi-element document), the illustrator system retrieves tags for the image element, generates a description of the image based on the tags using a model, and determines an element-specific topic distribution for the image element by mapping the tags and/or the description to word embeddings associated with topics and then finding a distribution of the received topics For example, the element-specific topic distributions include, for each element and any combined text (from concatenating multiple text elements), a list of topics and a score associated with each topic in the list of topics.

In certain embodiments, the illustrator system generates multiple previews to display with the multi-element canvas in an illustrator application interface. Each of the previews are associated with a replacement multi-element canvas. When a preview is selected, the replacement multi-element canvas associated with the selected preview replaces the multi-element canvas in the illustrator application interface. In an example, a replacement multi-element replacement canvas associated with a preview could be generated by creating a new canvas that includes one or more substitute elements (e.g. text elements, image elements, or other elements) that are similar to one or more elements (e.g. text elements or image elements) of the multi-element canvas retrieved and/or generated by the illustrator system. For example, to generate the replacement multi-element canvas, the illustrator system substitutes a text element of particular characteristics (e.g. font, size, style, color, or other characteristic) of the multi-element canvas with a substitute text element in the replacement multi-element canvas. In some instances, the illustrator system displays multiple previews in the user interface in the multi-element canvas, each of the multiple previews being associated with a replacement multi-element canvas.

In certain embodiments, the illustrator system receives a selection of an element (e.g. an image element or a text element) of a multi-element canvas displayed on an illustrator application interface. The illustrator system generates a set of replacement multi-element canvases and also a set of previews for display in the illustrator application interface with the multi-element canvas. Each preview of the set of previews is associated with a suggested replacement multi-element document. Each preview displays a visual of how the replacement multi-element document would look. Each displayed preview is zoomed to focus on changes to an area of the selected element in the multi-element canvas that would result from replacing the multi-element canvas with the respective replacement multi-element canvas.

In certain embodiments, responsive to receiving a selection of a preview via the user interface, the illustrator system replaces the multi-element canvas with a replacement multi-element canvas associated with the selected preview. For example, the illustrator system displays, via the user interface, the replacement multi-element canvas instead of the multi-element canvas.

Example Operating Environment for Generating Previews of Suggested Replacement Multi-Element Canvases that are Zoomed to Focus on a Change to a Specific Element Referring now to the drawings, FIG. 1 depicts an example of a computing environment 100 for generating, by an illustrator system 120, previews 115 of suggested replacement multi-element canvases 116 that are zoomed to focus on a specific element. The computing environment 100 includes an illustrator system 120, which includes one or more processing devices that execute an intent determination module 121, a preview generator module 122, and a document editing module 123. The computing environment 100 includes a client computing device 110, which includes a user interface 111 and an illustrator application 119. In certain embodiments, the illustrator system 120 is a network server or other computing device connected to a network 130. The illustrator system 120 accesses or otherwise receives a multi-element canvas 114 and determines a global intent 127 for the multi-element canvas 114.

In certain embodiments, a multi-element canvas 114 is a document that includes multiple elements. In some instances, the multi-element canvas is a layered document or other composite document. In some instances, the multi-element canvas 114 includes a multi-media presentation (e.g. a slide presentation). In some instances, the multi-element canvas 114 includes an audio clip. In some instances, the multi-element canvas 114 includes a video. The multi-element canvas 114 is displayed in an illustrator application 119 interface. Examples of an element include a layer, a region, or other object in a multi-element canvas 114. Some examples of elements include text objects, text layers, image objects, image layers, background layers, background objects, regions of an image object, and regions of a text object. In some instances, elements include individual slides in a multi-media presentation. In some instances, elements include keyframes of a video. In some instances, elements include portions of an audio clip.

The illustrator system 120 receives, in some instances, the multi-element canvas 114 from the client computing device 110 or otherwise access the multi-element canvas 114 that is displayed in an illustrator application interface 113 of the client computing device 110. For example, the illustrator application interface 113 is a window or other application interface of the illustrator application 119 displayed on the user interface 111 through which the user interacts with the multi-element canvas. The illustrator system 120 generates a replacement multi-element canvas in which an element (e.g. a text element, an image element, a keyframe element of a video, an element of an audio clip, a slide element of a presentation, or other element) from the multi-element canvas is substituted with a replacement element in which one or more features (e.g. font, size, style, color, or other characteristic) are different from the corresponding characteristic or characteristics in the element. In some examples, the illustrator system 120 generates the replacement element based on the determined global intent 127 for the multi-element canvas 114. For example, the illustrator system 120 determines element-specific topic distributions for each element of the multi-element canvas and determines a global intent based on the element-specific topic distributions. An element-specific topic distribution, in some instances, includes a list of topics, terms, or labels associated with an element of the multi-element canvas 114 and a probability, frequency, or other score for each of the topics. In certain examples, the list of topics in the element-specific topic distribution is ranked. The global intent, in some instances, includes a sequence of topics, terms, or labels determined based at least in part on an aggregation of the element-specific topic distributions associated with the elements of the multi-element document.

The illustrator system 120 generates and displays a preview 115 associated with the replacement multi-element canvas 116. The preview 115 is a user interface object displayed in the illustrator application interface 113 that provides a visual preview of the replacement multi-element canvas 116. In certain embodiments, the illustrator system 120 generates multiple previews 115 (e.g. previews 115-1, 115-2, . . . 115-n) for the multi-element canvas 114, where each of the multiple previews 115 is associated with a respective replacement multi-element canvas 116. When a preview 115 is selected (e.g. via selection of the preview 115 via the illustrator application interface 113), the illustrator system 120 updates the illustrator application interface 113 to display the replacement canvas 116 associated with the preview 115. In an example, the illustrator system 120 generates a replacement multi-element canvas 116 in which one or more elements (e.g. text elements or image elements) from the multi-element canvas 114 are substituted with one or more replacement elements retrieved and/or generated by the illustrator system 120. For example, the illustrator system 120.

In some instances, the illustrator system 120 displays multiple previews 115 in the illustrator application interface 113, each of the multiple previews 115 being associated with a replacement multi-element canvas 114. Each displayed previews 115 is zoomed to focus on changes to an element in the multi-element canvas that would result from replacing the multi-element canvas 114 with the respective replacement multi-element canvas 116. For example, if each of the set of previews 115 changes a specific text element of the multi-element canvas 114, each of the set of previews 115 is zoomed to focus on a change to the specific text element in the replacement multi-element canvas 116. In another example, if each of the set of previews 115 changes a specific image element in the multi-element canvas 114, each of the set of previews 115 is zoomed to focus on a change to the specific image element in the replacement multi-element canvas 116. In another example, where the multi-element canvas 114 is a slide presentation, if each of the set of previews 115 changes a specific slide element in the multi-element canvas 114, each of the set of previews 115 is zoomed to focus on a change to the specific slide element in the replacement multi-element canvas 116. In another example, where the multi-element canvas 114 is a video, if each of the set of previews 115 changes a specific keyframe in the video multi-element canvas 114, each of the set of previews 115 is zoomed to focus on a change to the specific keyframe in the replacement video multi-element canvas 116. In another example, where the multi-element canvas 114 is an audio clip, if each of the set of previews 115 changes a specific audio portion in the audio multi-element canvas 114, each of the set of previews 115 is zoomed to focus on a change to the specific portion in the replacement audio multi-element canvas 116. Responsive to receiving a selection of a preview 115 via the user interface, the illustrator system 130 replaces the multi-element canvas 114 with a replacement multi-element canvas 116 associated with the selected preview 115.

The illustrator system 120 (including the intent determination model 121, the preview generator module 122, and/or the document editing module 123) may be implemented using software (e.g., code, instructions, program) executed by one or more processing units (e.g., processors, cores), hardware, or combinations thereof. The software may be stored on a non-transitory storage medium (e.g., on a memory device). The computing environment 100 depicted in FIG. 1 is merely an example and is not intended to unduly limit the scope of claimed embodiments. One of the ordinary skill in the art would recognize many possible variations, alternatives, and modifications. For example, in some implementations, the illustrator system 120 (including the intent determination model 121, the preview generator module 122, and/or the document editing module 123) can be implemented using more or fewer systems or subsystems than those shown in FIG. 1, combines two or more subsystems, or has a different configuration or arrangement of the systems or subsystems.

Figure 4:
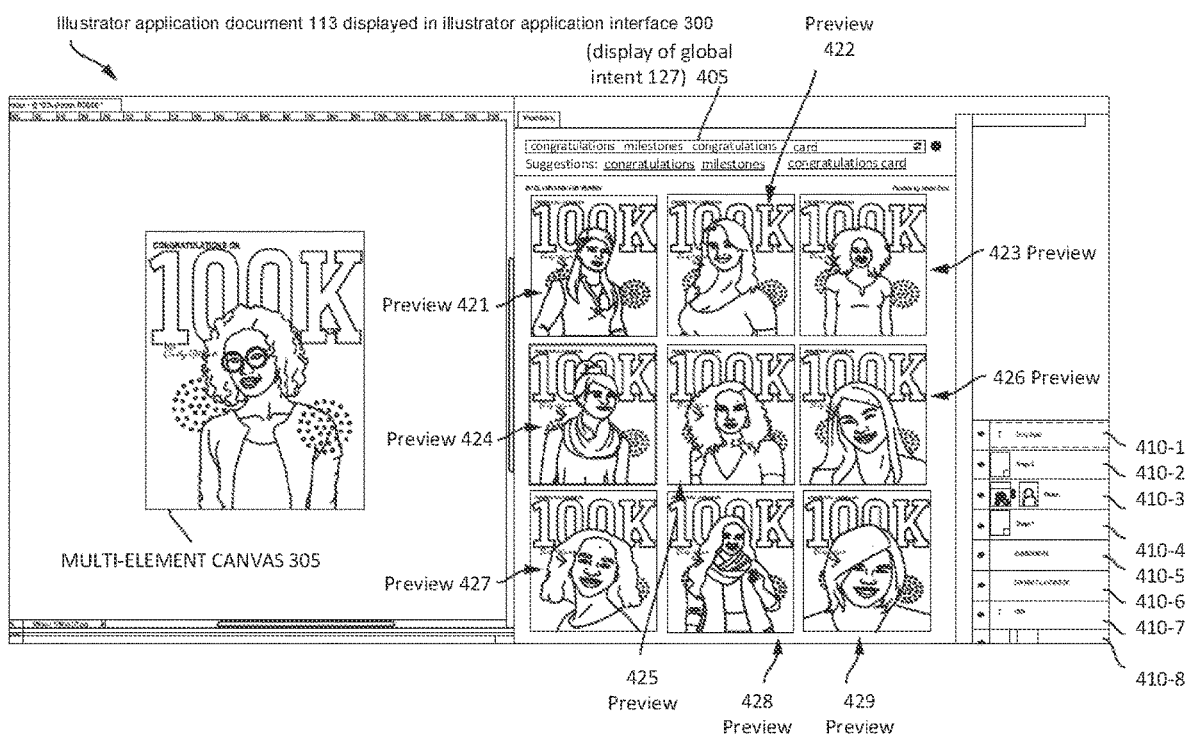
FIG. 4 depicts an example of a method for determining a global intent for a multi-element canvas for use in the process of FIG. 2, according to certain embodiments disclosed herein.
Figure 5:
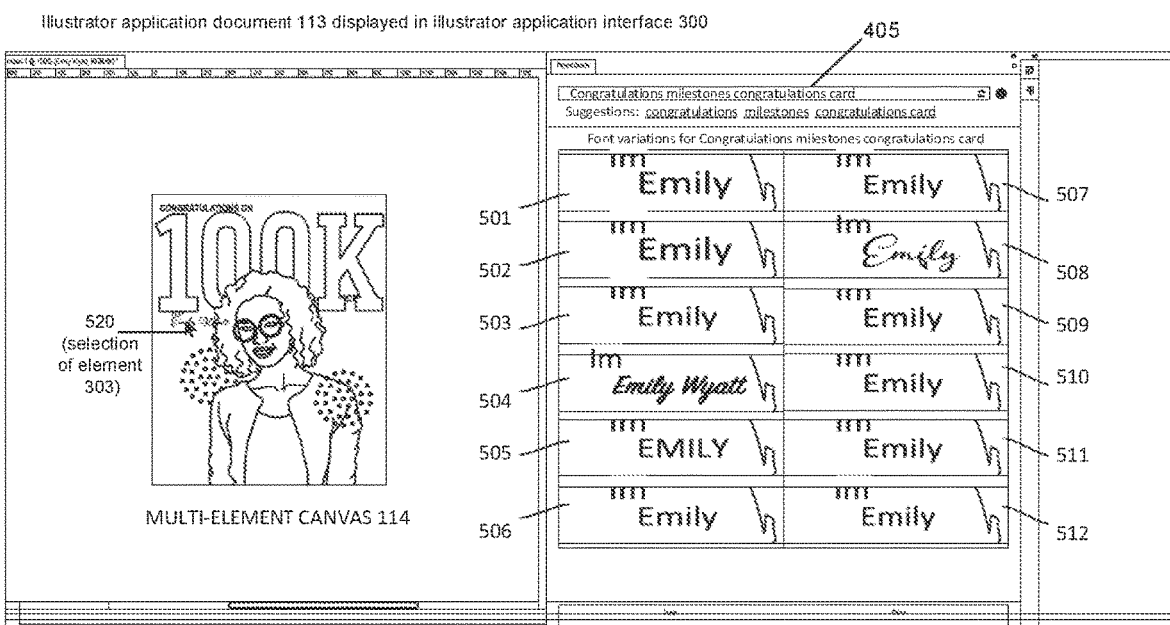
FIG. 5 depicts an illustration of the example multi-element canvas, including a set of zoomed previews of suggested replacement multi-element canvases, according to certain embodiments described herein.

In some examples, the illustrator system 120 comprises an intent determination module 121, a preview generator module 122, a document editing module 123, and a data storage unit 125. The illustrator system 120 accesses or otherwise receives a multi-element canvas 114 and determines a global intent 127 for the multi-element canvas 114. The illustrator system 120 receives the multi-element canvas 114 from the illustrator application 119. FIG. 5 depicts an illustration of an example multi-element canvas displayed in a user interface, according to certain embodiments disclosed herein. The intent determination module 121 determines the global intent 127 for the multi-element canvas 114. FIG. 4 depicts an example method for determining a global intent 127 for a multi-element canvas 114, in accordance with certain embodiments described herein. In certain examples, the intent determination module 121 determines the global intent 127 based on element-specific topic distributions determined for a plurality of elements of the multi-element canvas 114. For example, the intent determination module 121 identifies a plurality of elements in the multi-element canvas 114 and determines, for each element of the plurality of elements, an element-specific topic distribution. In certain examples, the intent determination module 121 updates the illustrator application interface 113 to display the determined global intent 127 in a field or other area of the illustrator application interface 113.

In certain examples, the preview generator module 122 generates a replacement multi-element canvas 116 in which at least one element from the multi-element canvas 114 is substituted with a respective replacement element that is different from the corresponding at least one element in the multi-element canvas 114. In certain examples, the preview generator module 122 finds or otherwise generates candidate replacement elements based on the global intent 127 of the multi-element canvas 114 and selects the replacement element from the candidate replacement elements. In certain examples, the replacement element is an image element and the preview generator module 122 uses an optimization method to resize and/or shift the replacement image element so that a region of the replacement image element is aligned with a corresponding region of the image element of the multi-element canvas 114.

In certain examples, the preview generator module 122 generates and displays a preview 115 associated with the replacement multi-element canvas 116. The preview is a user interface object displayed in the illustrator application interface 113 that provides a visual preview of the replacement multi-element canvas 116. In certain embodiments, the preview generator module 122 generates multiple previews (e.g. previews 115-1, 115-2, . . . 115-n) for the multi-element canvas 114, where each of the multiple previews 115 is associated with a respective replacement multi-element canvas 116. In the example depicted in FIG. 1, the preview 115-1 is associated with the replacement multi-element canvas 116. In certain examples, the preview generator module 122 generates a zoomed preview 115 which displays a view of the replacement multi-element canvas 116 that is focused on a particular element of the replacement multi-element canvas 116. In certain examples, the preview generator module 122 detects, within the multi-element canvas 114 a selection of a particular element and generates multiple previews 115 which are zoomed to focus on changes to the selected particular element. The preview generator module 122 updates the illustrator application interface 113 to display the multi-element canvas 114 along with the multiple generated previews 115. In this example, the zoomed preview 115 provides a view of the replacement canvas 116 that is zoomed to focus on the replacement element in the replacement multi-element canvas 116. The preview generator module 122 generates, responsive to selection of a preview, a replacement multi-element canvas 116 in which at least the selected element is replaced by a replacement element.

In certain examples, the document editing module 123 receives, from the illustrator application 109, an input via the illustrator application interface 113 of a selection of a preview 115 associated with a replacement multi-element canvas 116. Responsive to receiving the selection of the preview 115, the document editing module 123 renders, on the client device 110 an updated illustrator application interface 113 including a display of the replacement multi-element canvas 116. In the example depicted in FIG. 1, responsive to the selection of the preview 115-1, the replacement multi-element canvas 116 is displayed in the illustrator application interface 113. In the example depicted in FIG. 1, previews 115-2 and other of n previews are associated with other replacement multi-element canvases.

The data storage unit 125 is a memory accessible to the illustrator system 120. The data storage unit 125 stores a multi-element canvas 114 and a global intent 127 determined for the multi-element canvas 114. The data storage unit 125, in some examples, includes a database of image elements from which the illustrator system 120 retrieves candidate replacement image elements to use in generating a replacement multi-element canvas 116. The data storage unit 125 stores an element editing history for a multi-element canvas 114 that indicates, for each element, an indication of if and when the element has been edited. For example, the element editing history provides a time-stamped editing history for each element of the multi-element canvas. The data storage unit 125 stores one or more replacement multi-element canvases 116 generated for a respective one or more previews 115.

Figure 2:
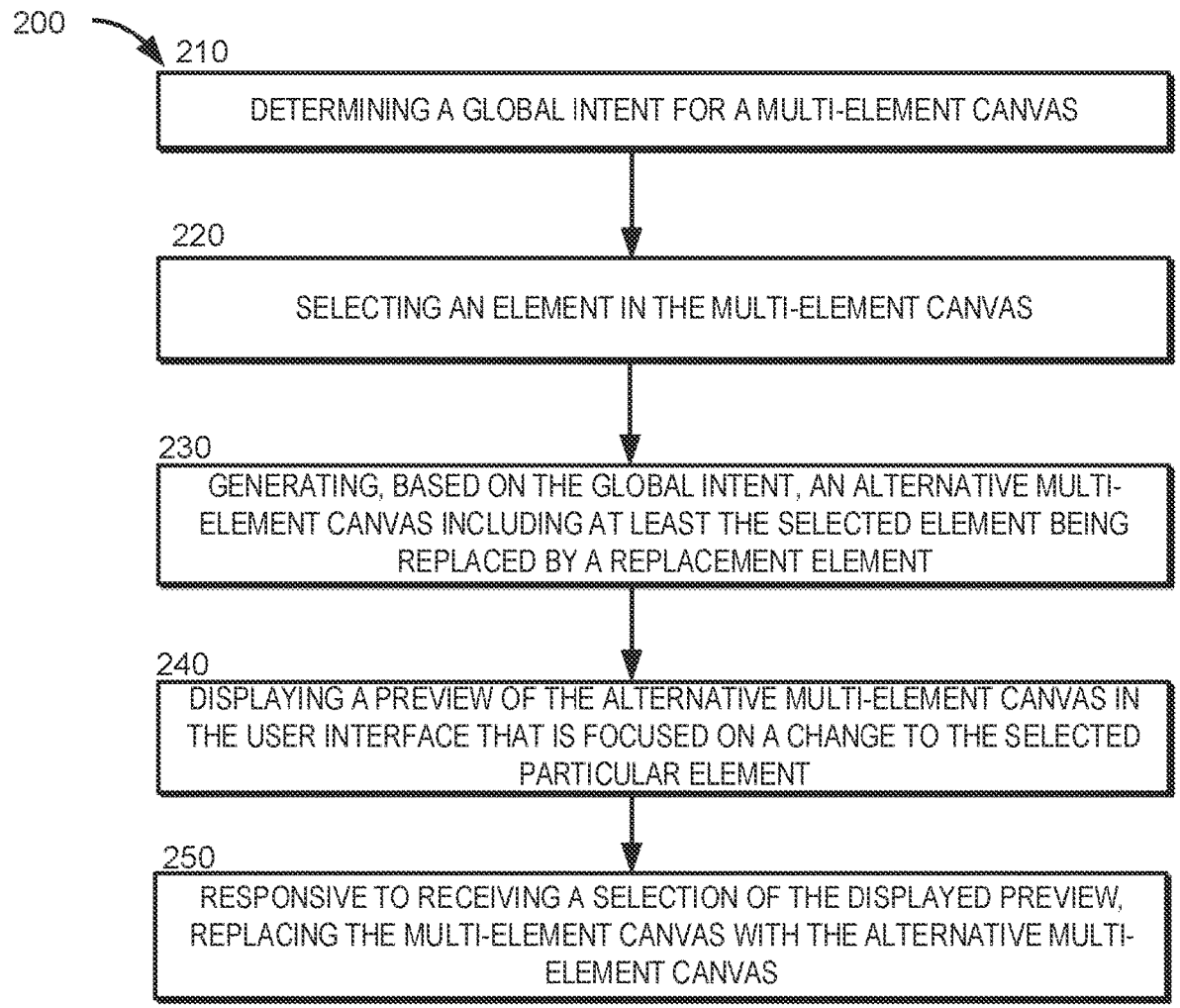
FIG. 2 depicts an example of a method for generating previews of suggested replacement multi-element canvases that are zoomed to focus on a change to specific element, according to certain embodiments described herein.

Examples of Computer-Implemented Operations for Generating Previews of Suggested Replacement Multi-Element Canvases that are Zoomed to Focus on a Change to a Specific Element FIG. 2 depicts an example of a process 700 for generating previews of suggested replacement multi-element canvases 116 that are zoomed to focus on a change to a specific element, according to certain embodiments described herein. One or more computing devices (e.g., illustrator system 120 or the individual modules contained therein) implement operations depicted in FIG. 2. For illustrative purposes, the process 200 is described with reference to certain examples depicted in the figures. Other implementations, however, are possible.

At block 210, the method 200 involves selecting, by a preview generator module 122, an element in a multi-element canvas 114. The multi-element canvas 114 includes a plurality of elements. In some instances the multi-element canvas 114 is a layered document and the elements are a plurality of layers in the layered document. In some instances, elements are regions of the multi-element canvas 114. In some instances, elements are chronological portions of the multi-element canvas 114, for example, slides in a slide presentation, keyframes in a video, and/or portions of audio in an audio clip. The multi-element canvas 114 could be a slide presentation, a video, an audio clip, a word processing document, or other document.

In certain examples, the preview generator module 122 selects an element corresponding to a user selection of the element via a user interface 111 in the multi-element canvas 114. For example, the multi-element canvas 114 is displayed in the illustrator application interface 113 of the illustrator application 119. For example, the illustrator application is associated with the illustrator system 120 and communicates with the illustrator system 120 via a network 130. For example, the multi-element canvas 114 is displayed within the illustrator application interface 113 and the illustrator application 109 receives an input of a selection (e.g. a click or other input by a user) of the image element. For example, the user selects, via the user interface 111, a layer or region of the multi-element canvas 114 and the preview generator module 122 detects the selection and determines the element that corresponds with the selected area of the user interface 111. In another example, where the multi-element canvas 114 includes a video, the user interface 111 includes a user interface object for viewing a series of chronological keyframe elements that constitute a portion of the video and the preview generator module 122 detects a selection of a particular keyframe element via the user interface object. In another example, where the multi-element canvas 114 includes an audio clip, the user interface 111 includes a user interface object for viewing a series of chronological audio portions that constitute the audio clip and the preview generator module 122 detects a selection of a particular audio portion element via the user interface object. In another example, where the multi-element canvas 114 includes a slide presentation, the user interface 111 includes a user interface object for viewing a series of slide elements that represent slides of the slide presentation and the preview generator module 122 detects a selection of a particular slide element via the user interface object. The illustrator application 109 communicates the selection of the element to the illustrator system 120. In certain examples, the preview generator module 122 identifies the selected element. For example, document metadata associated with the multi-element canvas 114 indicates, in some instances, elements of the multi-element canvas 114 and corresponding areas (e.g. for a presentation) or chronological portions (e.g. for videos and audio clips) of the multi-element canvas encompassed by the elements.

In certain examples, the preview generator module 122 selects an element in the multi-element canvas 114 based on an edit history of the multi-element canvas 114. For example, the user performed one or more previous edits of the multi-element canvas using edit tools (e.g. adding an image layer, moving an image layer, adding a text box, editing a text box, removing a keyframe, applying a particular edit to a particular keyframe, removing an audio portion, applying a particular edit to a particular audio portion, removing a slide, applying a particular edit to a particular slide, etc.). In some instances, the preview generator module 122 determines an edit history for the plurality of elements to the multi-element canvas 114 describing one or more edits previously applied to the multi-element canvas 114. The preview generator module 122 selects, based on the edit history, an element. The edit history specifies a time series of editing operations, where each editing operation specifies a type for the edit (e.g. font size change, color change, size change, rotation, duplication, deletion, a particular element to which the edit was applied, and a time stamp corresponding to a time at which the edit was applied. In some examples, the preview generator selects a most-recently edited element from the plurality of edits as the selected element, for example, selecting the element corresponding with a latest (chronologically) time stamp. For example, the user most recently applied an edit to a text element or image element and the preview generator module 122 selects the text or image element that was the subject of the most-recently-applied edit. In another example, the edit history includes similar edits to multiple elements, for example, an edit to multiple text elements within the multi-element canvas 114 changing the respective text elements to have a specific font and/or size characteristic. In this other example, the preview generator module 122 selects another text element in the multi-element canvas that is not one of the multiple text elements to which a similar edit was applied. In certain examples, the preview generator module 122 selects an element in the multi-element canvas 114 based on an edit history of the user with respect to multiple multi-element canvases 114. For example, the preview generator module 122 accesses an edit history for the user of the current multi-element canvas 114 and determines an editing pattern that is common across multiple multi-element canvases 114. For example, the editing history indicates that the user, in the past three multi-element canvases 114 has performed an initial editing operation comprising changing the background. In this example, the preview generator module 122 determines that no edit has been made to the current multi-element canvas 114 and selects the background layer based on the editing pattern in the editing history of the user across multiple multi-element canvases 114. In certain examples, the preview generator module 122 selects an element in the multi-element canvas 114 based on an aggregate edit history of users of the illustrator system 120. For example, the preview generator module 122 accesses an aggregate edit history and determines popular editing patterns that are common across multiple multi-element canvases 114 by multiple users. For example, the editing history indicates that many users prefer changing text elements to a particular font and selects a text element in the multi-element canvas 114 based on this editing pattern. In certain examples, the user configures (e.g. via one or more user interface 111 objects in the multi-element canvas 114) the level of edit history upon which the preview generator module 120 selects elements in the multi-element canvas 114 for editing. For example, the user selects an option to consider, as a basis for selecting an element in the multi-element canvas 114, (a) just the editing history of the user with respect to the current multi-element canvas, (b) the editing history of the user across multiple multi-element canvases 114, or (c) an aggregate editing history of multiple users across multiple multi-element canvases.

At block 220, the method 200 involves generating, by the preview generator module 122, a replacement multi-element canvas 116 that includes at least a replacement element that replaces the selected element. In an example, the preview generator module 122 generates a replacement multi-element canvas 116 by creating a new canvas that includes at least a substituted element (e.g. a text element, an image element, a slide of a presentation, a keyframe of a video, a portion of an audio clip, or other element) that is similar to the selected element of the multi-element canvas 114. The preview generator module 122 retrieves and/or generates the substitute element. In some instances, the preview generator module 122 queries an image database using one or more terms from the determined global intent 127 and then selects a substitute image element to use in the replacement multi-element canvas 116 that replaces an image element in the multi-element canvas 114. In some instances, the preview generator module 122 generates a substitute text element with one or more font, size, style, color, or other changes to the text element when compared with the original text element. The one or more changes to font, size, style, color, or other features are performed based on the determined global intent 127 of the multi-element canvas 114, as described herein. In some instances, the preview generator module 122 generates a substitute keyframe element for a video with one or more changes to the keyframe element when compared with the original keyframe element. The one or more changes to the keyframe element could include changes to a duration of the keyframe, a change to one or more objects depicted in the keyframe, an addition of an object to the keyframe, a deletion of an object from the keyframe, changes to color or other image properties of the keyframe, or other changes to the keyframe. In some instances, the preview generator module 122 generates a substitute slide element for a slide presentation with one or more changes to the slide element when compared with the original slide element. The one or more changes to the slide element could include, an addition of an object or layer within the slide, a deletion of an object or layer from the slide, an edit (e.g. rotation, resizing, change in color, duplication, relocation, or other edit) to an object or layer in the slide, changes to color or other image properties of the slide or objects or layers of the slide, or other changes to the slide.

In some instances, the preview generator module 122 generates a substitute audio portion element of an audio clip with one or more changes to the audio portion element. The one or more changes could include, an addition of audio within the audio portion element, a deletion of auido within the audio portion element, an edit (e.g. an increase in volume, a decrease in volume, a removal of noise, an addition of noise, or other edit) to an audio portion in the audio clip.

In an example, the multi-element canvas 114 includes elements A, B, and C, and the preview generator module 122 receives a selection of element B via the illustrator application interface 113. In this example, the preview generator module 122 generates a replacement multi-element canvas 116 includes elements, A, B, and D, where element D has one or more similar visual features to element C that was selected in the multi-element canvas 114. In this example, element D is similar to element C but is not the same element as element C. In this example, element D is substituted, in the replacement multi-element canvas 116, for element C that is in the multi-element canvas 114. In some examples, to generate the replacement multi-element canvas 114, the preview generator module 122 substitutes a text element of particular characteristics (e.g. font, size, style, color, or other characteristic) of the multi-element canvas 114 with a substitute text element in the replacement multi-element canvas 116. In some examples, to generate the replacement multi-element canvas 114, the preview generator module 122 substitutes, in the replacement multi-element canvas 116, an image element that is in the multi-element canvas 114 with a substitute image element. In some examples, the preview generator module 122 substitutes a text element with a substitute text element, a video keyframe element with a substitute video keyframe element, a slide element with a substitute slide element, an audio portion element with a substitute audio portion element, or otherwise substitutes an element with a replacement element. In certain examples, the generation of the replacement multi-element canvas 116 maintains a layer order of the multi-element canvas 114. For example, if the multi-element canvas 114 includes an image layer on top of a text layer on top of a background layer, the replacement multi-element canvas 116 includes the same order of layers. In other examples, however, the preview generator module 122 varies the layer order of the replacement multi-element canvas 116 from the layer order of the multi-element canvas 114. In certain examples, the generation of the replacement multi-element canvas 116 maintains a chronological order of elements of the multi-element canvas 114. For example, if a video multi-element canvas 114 includes a first keyframe, a second keyframe, and a third keyframe, the replacement multi-element canvas 116 includes the same order of keyframes in the replacement video multi-element canvas 116. In other examples, however, the preview generator module 122 varies the chronological order of the replacement multi-element canvas 116 elements from the original chronological order of the elements in the multi-element canvas 114.

At block 230, the method 700 involves displaying, by the preview generator module 122, a preview of the replacement multi-element canvas 116 in the user interface 111 that is displayed to focus on a change to the selected particular element. In some instances, focusing on the change includes zooming the preview to focus on an area of replacement particular element. In certain examples, the preview generator module 122 determines an area associated with the selected element in the multi-element canvas 114 and an area in the replacement multi-element canvas 116 that corresponds to the area in the multi-element canvas 114. The preview generator module 122 then generates a preview that includes a zoomed view of the replacement multi-element canvas 116 that displays the area in the replacement multi-element canvas 116 that corresponds to the area of the multi-element canvas 114. In some instances, the area in the replacement multi-element canvas includes the replacement element corresponding to the selected element. In some instances, the preview merely displays the area in the replacement multi-element canvas 116. In other instances, the preview displays the area in the replacement multi-element image plus a predefined additional one or more dimensions. For example, if the dimensions of the area in the replacement multi-element canvas 116 is 30 pixels by 30 pixels, the zoom area of the preview could include 10 pixels extra in both x and y dimensions (e.g. a view of the area including 40 pixels by 40 pixels).

In some instances, focusing on the change includes displaying a portion of an interface object that shows a series of chronological elements that make up the replacement multi-element canvas 116 associated with the preview to focus on a chronological portion of the replacement multi-element canvas 116 that is associated with the replacement particular element. For example, the multi-element canvas 114 includes a video and the preview generator module 122 displays a user interface object for viewing a series of chronological keyframe elements that constitute a portion of the video and the preview generator module 122 displays the replacement keyframe element within the user interface object via the user interface. In certain examples, the focused preview includes a predetermined number of keyframe elements that precede or follow the replacement keyframe element. For example, the focused preview includes a view of the previous keyframe, the replacement keyframe, and a subsequent keyframe within the user interface object.

In certain examples, the multi-element canvas 114 includes an audio clip and the preview generator module 122 displays a user interface object for viewing a series of audio portion elements that each constitute a portion of the audio clip and the preview generator module 122 displays the replacement audio portion element within the user interface object via the user interface. In certain examples, the focused preview includes a predetermined number of audio portion elements that precede or follow the replacement audio portion element. For example, the focused preview includes a view of the previous audio portion, the replacement audio portion, and a subsequent audio portion within the user interface object.

In some instances, the multi-element canvas 114 includes a slide presentation and the preview generator module 122 displays a user interface object for viewing a series of slide elements that each constitute a portion of the slide presentation and the preview generator module 122 displays the replacement slide element within the user interface object via the user interface. For example, the focused preview includes a predetermined number of slide elements that precede or follow the replacement slide element. For example, the focused preview includes a view of the previous slide, the replacement slide element, and a subsequent slide within the user interface object.

The preview generator module 122 updates the user interface 111 to display a preview 115 of the replacement multi-element canvas 116 with the multi-element canvas 114, where the preview 115 is focused as described herein. In certain embodiments, the preview generator module 122 generates a preview 115 to display with the multi-element canvas in an illustrator application interface. The preview 115 is associated with a replacement multi-element canvas 116. In certain examples, the illustrator system displays the preview 115 in the illustrator application interface 113 in which the multi-element canvas is displayed. The previews 115 are interface objects that provide an indication of a visual look of the replacement multi-element canvas. In some instances, the illustrator system 120 displays multiple focused previews 115 in the illustrator application interface 113 with the multi-element document 114, each of the multiple zoomed previews 115 (e.g. n previews 115-1, 115-2, . . . , 115-n) being associated with a respective replacement multi-element canvas 116 generated by the preview generator module 122.

At block 240, the method 200 involves replacing, by the document editing module 123 responsive to receiving a selection of the displayed preview, the multi-element canvas 114 in the user interface 111 with the replacement multi-element canvas 116. Responsive to receiving a selection of a preview 115 via the illustrator application interface 113, the document editing module 123 replaces the multi-element canvas 114 displayed in the illustrator application interface 113 with the replacement multi-element canvas 116 associated with the selected preview 115.

Figure 3:
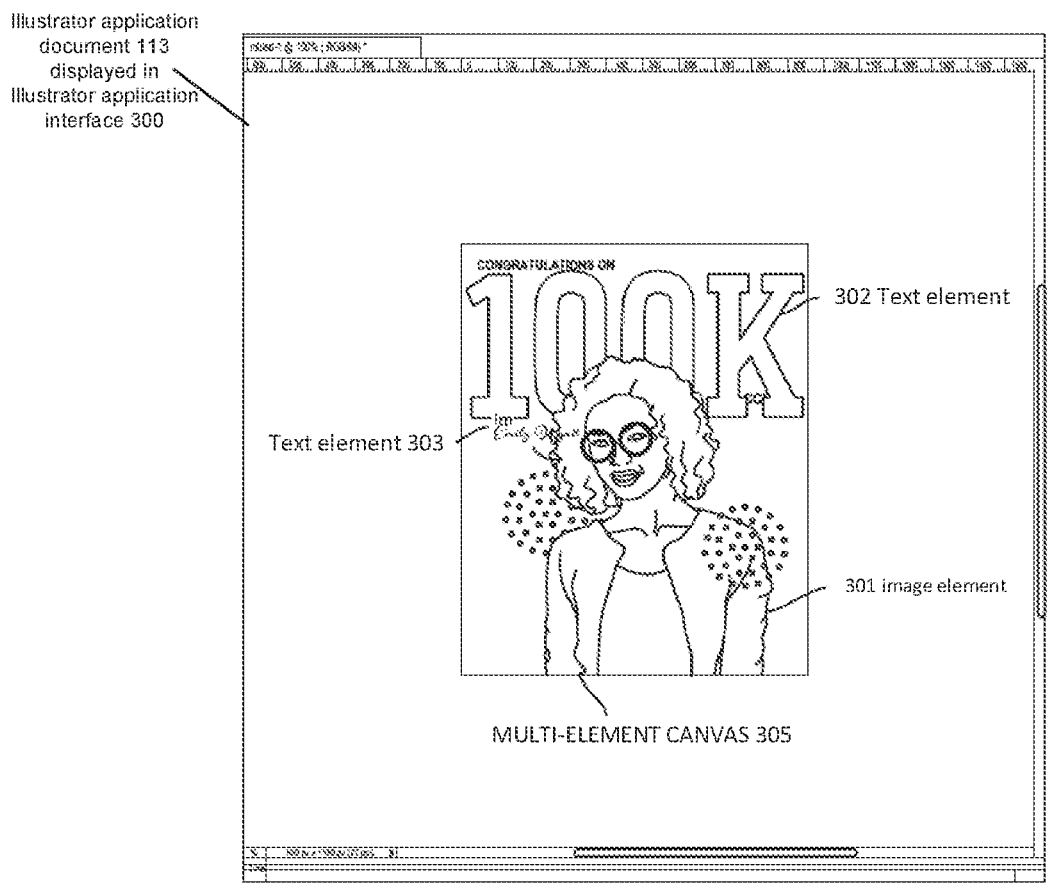
FIG. 3 depicts an illustration of the example multi-element canvas, including a set of zoomed previews of suggested replacement multi-element canvases, according to certain embodiments described herein.

FIG. 3 depicts an illustration of an example multi-element canvas 305 displayed in an illustrator application interface 300, according to certain embodiments disclosed herein. For illustrative purposes, FIG. 3 is described with reference to certain examples depicted in the figures. Other implementations, however, are possible. In FIG. 3, the illustrator application interface 300 is provided by an illustrator application 119 executing on a client device 110 and displayed via the user interface 111. The multi-element canvas 305 is a layered multi-element canvas 114 that includes, among multiple elements, a background element layer, a text element 302 layer that reads "100K," a text element 303 that reads "I'm Emily Wyatt," and an image element 301 layer of a woman wearing glasses. As depicted in FIG. 3, the multi-element canvas 305 is layered such that the image element 301 is in front of the text element 302.

Figure 6:
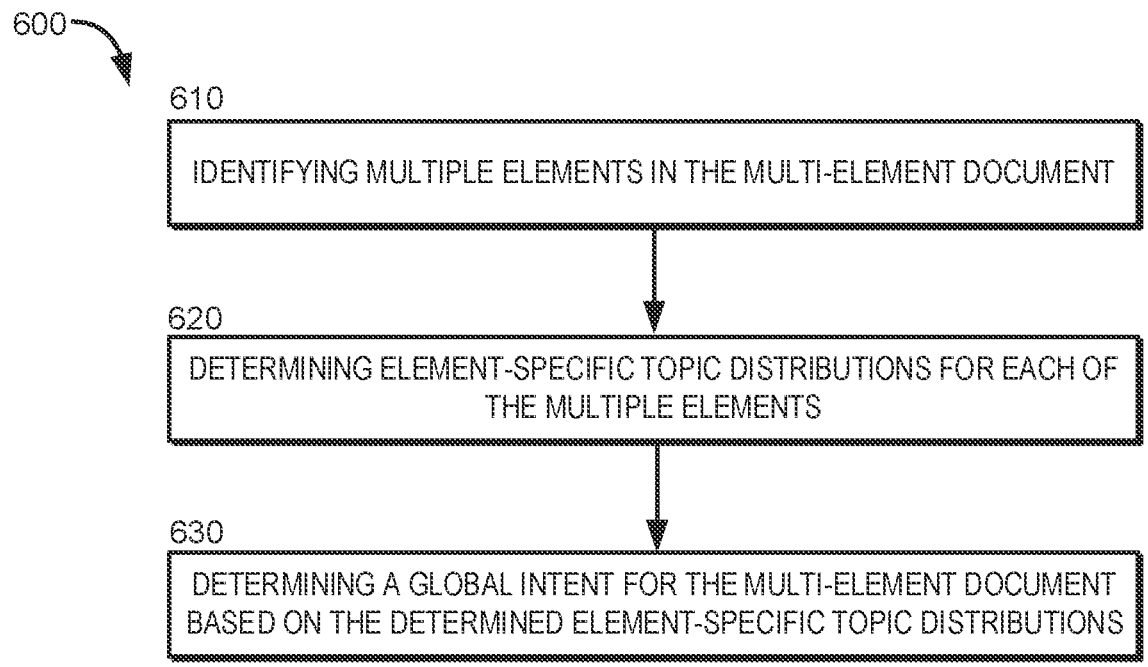
FIG. 6 depicts an example of a process for determining a global intent for a multi-element canvas and generating, based on the global intent, a preview of a suggested replacement multi-element canvas, in accordance with certain embodiments described herein

FIG. 4 depicts an illustration of the example multi-element canvas 305 of FIG. 3 with previews of suggested replacement multi-element canvases 116, according to certain embodiments disclosed herein. For illustrative purposes, FIG. 6 is described with reference to certain examples depicted in the figures. Other implementations, however, are possible. In FIG. 6, the illustrator application interface 300 is provided by an illustrator application 119 executing on a client device 110. As depicted, the multi-element canvas 305 is displayed within a section of the illustrator application interface 300. As depicted in FIG. 4, the illustrator application interface 300 displays a list of elements detected in the multi-element canvas 305, including elements 410-1, 410-2, 410-3, 410-4, 410-5, 410-6, 410-7, and 410-8. For example, the list of elements include a text element 410-1 ("I'm Emily Wyatt"), where element 410-1 corresponds to text element 305. The list of elements further includes a masked image element 410-3, a text element 410-5 ("Subscribers"), a text element 410-6 ("Congratulations on"), a text element 410-7 ("100K"), and a background image element 410-8. The illustrator application interface 300 includes a global intent field 405 that displays a global intent 127, "Congratulations milestone congratulations card" determined by the illustrator system 120 for the multi-element canvas 305. Further, the illustrator application interface 300 includes a set of previews 421, 422, 423, 424, 425, 426, 427, 428, and 429, each displayed in a section of the illustrator application interface 300 as user interface objects. Each of the set of previews 421-429 is associated with a respective replacement multi-element canvas 116 associated with the preview and provides a visual look of the respective replacement multi-element canvas 116. In the example depicted in FIG. 6, the illustrator application 119 is configured to display, responsive to receiving a selection of a particular preview (e.g. preview 421 selected from among the set of previews 421-429), a replacement multi-element canvas 116 associated with the selected preview to replace the currently displayed multi-element canvas 114.

FIG. 5 depicts an illustration of the example multi-element canvas, including a set of zoomed previews of suggested replacement multi-element canvases, according to certain embodiments described herein. For illustrative purposes, FIG. 5 is described with reference to certain examples depicted in the figures. Other implementations, however, are possible. In FIG. 5, the illustrator application interface 300 is provided by an illustrator application 119 executing on a client device 110 and is displayed via the user interface 111. As depicted, the multi-element canvas 114 of an illustrator application document 113 is displayed via the illustrator application interface 300. Further, the illustrator application interface 300 displays a set of previews 501, 502, 503, 504, 505, 506, 507, 508, 509, 510, 511, and 512, each displayed in a section of the illustrator application interface 300 as user interface objects. Each of the set of previews 501-512 is associated with a respective replacement multi-element canvas 116 associated with the respective preview and provides a visual look of the replacement multi-element canvas 116 that is zoomed to focus on an area corresponding to the element 303, a selection 520 of which is illustrated in the multi-element canvas via the cursor displayed at element 303. For example, as depicted in FIG. 3, a user of the illustrator application 109 has selected a text element that recites "I'm Emily Wyatt" and the previews 115 (e.g. 501-512) each provide a zoomed view of an area in a respective replacement document 116 that a corresponds to an area of the text element "I'm Emily Wyatt" selected in the multi-element canvas 114. In certain examples, the illustrator system 120 generates each of the replacement canvases 116 as well as the zoomed previews 501-512 according to method 200 described in FIG. 2. In the example depicted in FIG. 5, the illustrator application 119 is configured to display, responsive to receiving a selection of a particular preview (e.g. one of the previews 501-512), a replacement multi-element canvas 116 associated with the selected preview to replace the currently displayed multi-element canvas 114.

Example Processes for Determining a Global Intent for a Multi-Element Document

FIG. 6 depicts an example of a process 600 for determining a global intent for a multi-element canvas and generating, based on the global intent, a preview of a suggested replacement multi-element canvas, in accordance with certain embodiments described herein. One or more computing devices (e.g., illustrator system 120 or the individual modules contained therein) implement operations depicted in FIG. 6. For illustrative purposes, the process 400 is described with reference to certain examples depicted in the figures. Other implementations, however, are possible.

At block 610, the method 600 involves identifying, by the intent determination module 121, multiple elements in the multi-element canvas 114. For example, the multi-element canvas 114 could include a background layer, with a text layer in front of the background layer, and an image layer in front of the text layer. In some instances, elements further include edits made to the multi-element canvas 114, including an addition of an element, a deletion of an element, a duplication of an element, modifying one or more features of an element (e.g. size, orientation, font size, color, or other feature), or other edits to one or more elements in the multi-element canvas. In some instances, certain elements of the multi-element canvas 114 partially or completely overlap or occlude other elements of the multi-element canvas. For example, an image element or layer partially or completely occludes a text element or layer, or vice versa. In certain examples, the intent determination module 121 identifies one or more elements in the multi-element canvas 114 based on metadata of a document associated with the multi-element canvas 114.

At block 620, the method 400 involves determining, by the intent determination module 121, an element-specific topic distribution for each element of the multi-element canvas 114. In certain examples, the element specific topic distribution is a list of topics associated with the element and a score for each of the topics. In certain examples, the intent determination module 121 applies various methods to determine the element-specific topic distribution for elements according to a type of each element. The score for each topic in the topic distribution could be based on how many times the associated topic is encountered in topic-tagged images from an image search using a description generated from tags associated with an image element. In another example, the score for each topic in the topic distribution could be based on how many times the associated topic is encountered in topic-tagged images from an image search for images using text from a text element. In another example, the score for each topic in the topic distribution could be predicted by a supervised machine learning model using a text of a text element as input. In some instances, the illustrator system concatenates all text elements (e.g. text layers, text objects, etc.) into a combined text and determines an element specific topic distribution for the combined text, including a list of topics and a score for each topic. In certain embodiments, the scores associated with topics in the determined element-specific topic distributions fall within a predefined range (e.g. 0 to 10, 0 to 100, or other predefined range). In certain embodiments, the illustrator system ranks the element-specific topic distributions based on their scores.

In certain embodiments, the intent determination module 121 classifies (e.g. determines a type for) each element in a multi-element canvas 114 and determines an intent associated with each element based on the classification. The multi-element canvas 114 includes a plurality of elements. In some instances the multi-element canvas 114 is a layered document including a plurality of layers. Elements, in some instances, include multiple image elements and/or text elements. Elements could include layers in the multi-element canvas 114. For example, the multi-element canvas 114 could include a background layer, with a text layer in front of the background layer, and an image layer in front of the text layer.

In some instances, the intent determination module 121 determines that one or more of the elements of the multi-element canvas 114 is a text element that is greater than a threshold length. For example, the threshold length is a number of words. The number of words could be four, six, ten, or other predefined number of words. If the intent determination module 121 determines that the text element includes a text that is less than the threshold length, the intent determination module 121 finds documents tagged with topics by querying with various portions of the text.

The intent determination module 121 searches a document database for tagged documents by querying with various portions of the text. In certain examples, a search application programming interface (search API) is used to query the document database to find the tagged documents. The documents could include image documents, word documents, are tagged with topic labels. The intent document model 121 retrieves a predefined number of the documents that are retrieved in the search results and extracts the topic labels from the retrieved tagged documents. The intent determination module 121 determines an element-specific topic distribution for the text element from the tagged documents. In an example, the intent determination module 121 determines a topic label distribution in the retrieved, tagged documents. The topic label distribution, in some examples, is a list of topic labels and a score that indicates a number of each of the topic labels that was extracted from the retrieved tagged documents from querying the document database with the terms of the text element. In certain examples, the score is normalized to fall within a predefined range (e.g. 0 to 10, 0 to 100, etc.) and the list of topics is ranked from a highest score representing a topic that had a highest number of occurrences in the retrieved tagged documents and a lowest score representing a topic that had a lowest number of occurrences in the retrieved tagged documents.

In some instances, the intent determination module 121 determines that one or more of the elements of the multi-element canvas 114 is a text element including text that is less than a threshold length. For example, the threshold length is four words and the text element is less than four words. In these instances, the intent determination module 121 applies a machine learning model to the text of the text element to determine an element-specific topic distribution. In certain examples, the intent determination module 121 trains an explicit supervised model that takes a text as input and determines, from the input text, a list of topics associated with the input text and a score associated with each topic in the list of topics. The explicit supervised model could be a transformer model, for example, a bidirectional encoder representations for transformers model (e.g. BERT, distilBERT, or other BERT-based model). In certain examples, the supervised model is configured to generate a score, for each topic in the list of topics, within a predefined range (e.g. 0 to 10, 0 to 100, etc.), with a highest score representing a topic most likely to be associated with the text element and a lowest score representing a topic that is least likely to be associated with the text element. The intent determination module 121 ranks the scored list of topics according to the score output by the supervised model. For example, the list of topics is ranked from highest score to lowest score.

In certain embodiments, when the multi-element canvas 114 includes multiple text elements, the intent determination module 121 concatenates all text elements and determining an element-specific topic distribution for the concatenated text element. For example, a first text element reads "Halloween party," a second text element reads "you are invited," a third text element reads "from the Smith family," and a fourth text element reads "RSVP Debbie Smith." The intent determination module 121 concatenates the first text element, the second text element, the third text element, and the fourth text element to generate the following concatenated text element "Halloween party you are invited from the Smith family RSVP Debbie Smith." In this example, the intent determination module 121 determines an element-specific topic distribution for this concatenated text object. For example, the element-specific topic distribution is determined according to methods described above, wherein the method is selected, as also described above, based on whether the concatenated text is less than, equal to, or greater a threshold length.

In some instances, the intent determination module 121 determines that one or more of the elements of the multi-element canvas 114 is an image element. In these instances, the intent determination module 121 retrieves image tags and generates an image description of the image element based on the retrieved image tags. In certain examples, the image is a tagged image and the intent determination module 121 retrieves the image tags for the tagged image. The intent determination module 121 applies an application programming interface (API) or other method to generate a description from the image tags. For example, the intent determination module 121 could apply a Sensei API or use another method to determine an image description of a tagged image from a set of image tags. The intent determination module 121 determines an element-specific topic distribution for the image element based on the image tags and the description. From the description generated from the image tags, the intent determination module 121 determines a list of topics using word embeddings. For example, word embeddings are learned representations for text that have a similar meaning have a similar representation. The intent determination module 121 identifies a list of topics from the description by mapping a list of word embeddings associated with topics to text in the description generated for the image. For example, the intent determination module 121 generates a list of topics that correspond to word embeddings that are mapped to the text in the description. In certain examples, the intent determination module 121 scores the list of topics according to a number of times the word embedding associated with the topic was mapped to text in the description. In certain examples, the score is normalized to fall within a predefined range (e.g. 0 to 10, 0 to 100, etc.) and the list of topics is ranked from a highest score representing a topic associated with a word embedding that was mapped to text in the description a greatest number of times and a lowest score representing a topic associated with a word embedding that was mapped to text in the description a least number of times.

At block 630, the method 600 involves determining, by the intent determination module 121, a global intent 127 for the multi-element canvas 114 based on the determined element-specific topic distributions. To determine the global intent 127, the intent determination module 121 removes, from each element-specific topic distribution, all topics except for a predefined number of topics (e.g. three, five, ten, or other predefined number). For example, the intent determination module 121 generates reduced element-specific topic distributions by removing all topics from each element-specific topic distribution except for the predefined number of topics having a greatest score associated with the respective topics. The intent determination module 121 creates a first aggregated topic distribution by combining the reduced element-specific topic distributions. The intent determination module 121 determines a subset of edited and/or displayed elements in the multi-element canvas 114 including (1) elements that have been edited within the multi-element canvas 114 and/or (2) elements that are currently selected (e.g. currently selected in the illustrator application interface 113 of the illustrator application 119 of the client device 110) in the multi-element canvas 114. The intent determination module 121 creates a second aggregated topic distribution by combining reduced element-specific topic distributions associated with each of the subset of edited and/or currently selected elements. In certain embodiments, the intent determination module 121 determines the global intent by combining a predefined number of topics (e.g. three topics) from the first aggregated topic distribution with a predefined number of topics (e.g. one topic) from the second aggregate topic distribution. In certain examples, intent determination module 121 displays, via the illustrator application interface 113, the determined global intent 127. For example, the illustrator application interface 113 includes a field that displays the global intent 127 comprising a set of terms. In certain examples, the intent determination module 121 (or preview generator module 122) receives, via the illustrator application interface 113 (e.g. via an input to the field), a modification to the global intent 127. For example, the user of the illustrator application replaces one or more terms, delete one or more terms, change a spelling of one or more terms, change an order of one or more terms, add one or more terms, or otherwise modify the global intent 127.

In certain embodiments, determining the global intent 127 involves retrieving, by the intent determination module 121, element-specific topic distributions for each element of the multi-element canvas 114. In certain examples, the multi-element canvas 114 includes multiple text elements and the intent determination module 121 also retrieves an element-specific topic distribution for a concatenated text element. In certain examples, each element-specific topic distribution is a ranked list of topics ranked from a highest score to a lowest score. The highest score could indicate that the intent determination module 121 encountered the topic a greatest number of times in tagged document search results after querying a database of tagged documents using a description generated for the element (e.g. for an image element) or using various portions of text associated with the element (e.g. for a text element). The lowest score could indicate that the intent determination module 121 encountered the topic least number of times in tagged document search results after querying a database of tagged documents using a description generated for the element (e.g. for an image element) or using various portions of text associated with the element (e.g. for a text element). The intent determination module 121 reduces each element-specific topic distribution to a predefined number of topics. In certain examples, reducing an element-specific topic distribution comprises filtering the element-specific topic distribution to remove topics that are less than a threshold score or removing all topics except for a predefined number of topics. The predefined number of topics could be three topics, five topics, or other predefined number of topics. In an example, the element-specific topic distribution for an element of the multi-element canvas 114 includes a ranked list of five topics and the predefined number of topics is three topics. In this example, the intent determination module 121 retains a top three ranked topics in the ranked list of five topics and removes all other topics from the ranked list of topics. For example, the ranked list of topics for a particular element is, ranked from highest to lowest score, is "Halloween (5); party (3); birthday (2); family (1); scary (1)," where the numbers in parentheses represent the associated scores. In this example, the intent determination module 121 retains "Halloween (5); party (3); birthday (1)" in the ranked list of topics and removes "family (1); scary (1)" to generate a reduced element-specific topic distribution.

In certain embodiments, determining the global intent 127 involves generating, by the intent determination module 121, a first aggregated topic distribution and a second aggregated topic distribution. The first aggregated topic distribution includes all reduced element-specific topic distributions. For example, the intent determination module 121 generated a reduced element-specific topic distribution for each element of the multi-element canvas 114 in block 420, where each reduced element-specific topic distribution is a list of a predefined number (e.g. three) of the top-ranked topics associated with the element along with a score associated with each of the topics. The intent determination module 121 generates the first aggregated topic distribution by making a combined list of all of the reduced element-specific topic distributions, which are lists of the top-ranked predefined number of topics associated with each element, where each topic includes an associated score. In certain examples, the intent determination module 121 determines a score for each of the topics in the first aggregated topic distribution and ranks the first aggregated topic distribution from highest score to lowest score. The intent determination module 121 merges any topics in the combined list of topics that occur multiple times and add the scores that were the basis for ranking the list. For example, the combined list includes "Halloween (8); invitation (5); family (4); birthday party (3) Halloween (2); celebration (2); birthday party (1)," where the numbers in parentheses represent associated scores, and the intent determination module 121 merges the duplicate topics to generate the following first aggregated topic distribution: "Halloween (10), invitation (5), family (4), birthday party (4), celebration (2)." The intent determination module 121 generates a second aggregated topic distribution including reduced element-specific topic distributions associated with edited and/or selected elements. In certain examples, the intent determination module 121 accesses a document editing history of the multi-element canvas 114. For example, the document editing history provides a time-stamped editing history for each element of the multi-element canvas. The intent determination module 121 using the document editing history determines one or more elements of the multi-element canvas 114 that have been edited. The intent determination module 121 could determine, from the time-stamped editing history associated with each element, which elements of the multi-element canvas 114 have been edited since the multi-element canvas 114 was first created, since the last time the multi-element canvas 114 was saved, within a last predefined period of time (e.g. a last five minutes, a last ten minutes), or other timeframe for considering which elements of the multi-element canvas have been edited. The intent determination module 121 also determines which elements in the multi-element canvas 114 are currently selected via the illustrator application interface 113. In certain examples, a currently selected element is a text that is entered into a text element.

In certain embodiments, determining the global intent 127 involves making, by the intent determination module 121, a combined list of all of the reduced element-specific topic distributions for elements in the multi-element document 114 that have been edited or that are currently selected. In certain examples, the intent determination module 121 determine a score for each of the topics in the combined list and rank the topics in the combined list from highest score to lowest score. The intent determination module 121 merges any topics in the combined list of topics that occur multiple times, add the scores that were the basis for ranking the list, and re-rank the list as necessary after merging duplicate topics and adding scores. The intent determination module 121 determines a global intent 127 by extracting a predefined number of topics from the first aggregated topic distribution and a predefined number of topics from the second aggregated topic distribution. In some examples, the predefined number of topics from the first aggregated topic distribution is greater than the predefined number of topics from the second aggregated topic distribution. In other examples, the predefined number of topics from the second aggregated topic distribution is greater than the predefined number of topics from the first aggregated topic distribution. In certain examples, the extracted topics from the second aggregated topic distribution precede the extracted topics from the first aggregated topic distribution. However, in other examples, the extracted topics from the first aggregated topic distribution precedes the extracted topics from the second aggregated topic distribution. In an example, the first aggregated topic distribution is "Halloween (10), invitation (5), family (4), birthday party (4), celebration (2)," the second aggregated topic distribution is "birthday party (4) celebration (2)." In this example, the intent determination module selects three top ranked topics from the first aggregated topic distribution and one top ranked topic from the second aggregated topic distribution to generate the global intent 127, "Halloween invitation family birthday party."

Examples of Computing Environments for Implementing Certain Embodiments

Figure 7:
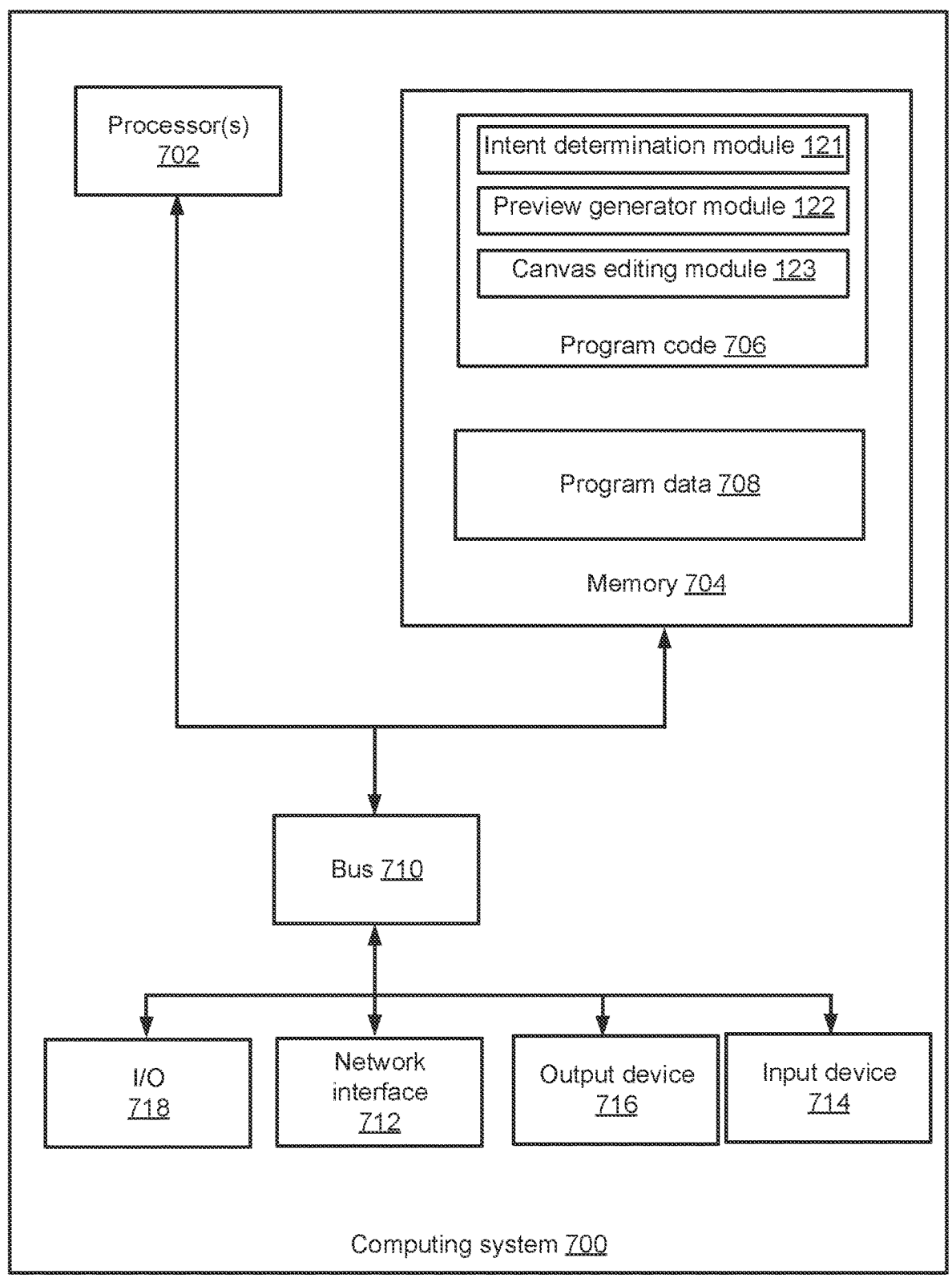
FIG. 7 depicts an example of a computing system that performs certain operations described herein, according to certain embodiments described in the present disclosure.

Any suitable computer system or group of computer systems can be used for performing the operations described herein. For example, FIG. 7 depicts an example of a computer system 700. The depicted example of the computer system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

The memory device 704 includes any suitable non-transitory computer-readable medium for storing program code 706, program data 708, or both. A computer-readable medium can include any electronic, optical, magnetic, or other storage device capable of providing a processor with computer-executable instructions or other program code. Non-limiting examples of a computer-executable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the memory device 704 can be volatile memory, non-volatile memory, or a combination thereof.

The computer system 700 executes program code 706 that configures the processor 702 to perform one or more of the operations described herein. Examples of the program code 706 include, in various embodiments, the intent determination module 121, preview generator module 122, and document editing module 123 of FIG. 1, which may include any other suitable systems or subsystems that perform one or more operations described herein (e.g., one or more neural networks, encoders, attention propagation subsystem and segmentation subsystem). The program code 706 may be resident in the memory device 704 or any suitable computer-readable medium and may be executed by the processor 702 or any other suitable processor.

The processor 702 is an integrated circuit device that can execute the program code 706. The program code 706 can be for executing an operating system, an application system or subsystem, or both. When executed by the processor 702, the instructions cause the processor 702 to perform operations of the program code 706. When being executed by the processor 702, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 704 store the program data 708 that includes one or more datasets described herein. In some embodiments, one or more of data sets are stored in the same memory device (e.g., one of the memory devices 704). In additional or alternative embodiments, one or more of the programs, data sets, models, and functions described herein are stored in different memory devices 704 accessible via a data network. One or more buses 710 are also included in the computer system 700. The buses 710 communicatively couple one or more components of a respective one of the computer system 700.

In some embodiments, the computer system 700 also includes a network interface device 712. The network interface device 712 includes any device or group of devices suitable for establishing a wired or wireless data connection to one or more data networks. Non-limiting examples of the network interface device 712 include an Ethernet network adapter, a modem, and/or the like. The computer system 700 is able to communicate with one or more other computing devices via a data network using the network interface device 712.

The computer system 700 may also include a number of external or internal devices, an input device 714, a presentation device 716, or other input or output devices. For example, the computer system 700 is shown with one or more input/output ("I/O") interfaces 718. An I/O interface 718 can receive input from input devices or provide output to output devices. An input device 714 can include any device or group of devices suitable for receiving visual, auditory, or other suitable input that controls or affects the operations of the processor 702. Non-limiting examples of the input device 714 include a touchscreen, a mouse, a keyboard, a microphone, a separate mobile computing device, etc. A presentation device 716 can include any device or group of devices suitable for providing visual, auditory, or other suitable sensory output. Non-limiting examples of the presentation device 716 include a touchscreen, a monitor, a speaker, a separate mobile computing device, etc.

Although FIG. 7 depicts the input device 714 and the presentation device 716 as being local to the computer system 700, other implementations are possible. For instance, in some embodiments, one or more of the input device 714 and the presentation device 716 can include a remote client-computing device that communicates with computing system 700 via the network interface device 712 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 8:
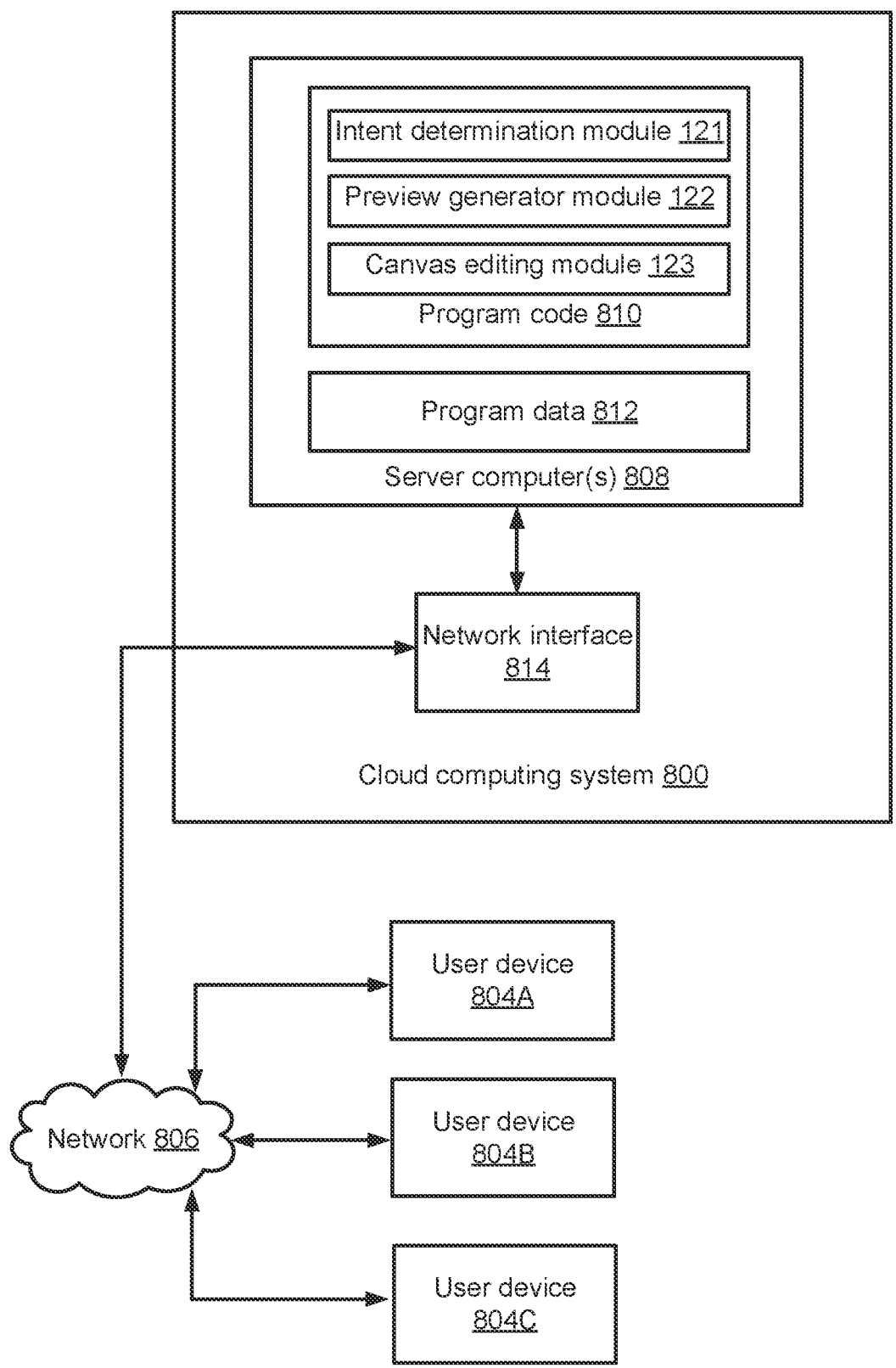
FIG. 8 an example of a cloud computing system that performs certain operations described herein, according to certain embodiments described in the present disclosure.

In some embodiments, the functionality provided by computer system 700 may be offered as cloud services by a cloud service provider. For example, FIG. 8 depicts an example of a cloud computer system 800 offering a service for determining a global intent 127 for a multi-element canvas 114 and a service for generating previews of replacement multi-element canvases 116 for a multi-element canvas 114, that can be used by a number of user subscribers using user devices 804A, 804B, and 804C across a data network 806. In the example, the service for generating previews of replacement multi-element canvases 116 for a multi-element canvas 114 may be offered under a Software as a Service (SaaS) model. One or more users may subscribe to the service for determining a global intent 127 for a multi-element canvas 114 and the service for generating previews of replacement multi-element canvases 116 for a multi-element canvas 114, and the cloud computer system 800 performs the processing to provide the service for determining a global intent 127 for a multi-element canvas 114 and the service for generating previews of replacement multi-element canvases 116 for a multi-element canvas 114 to subscribers. The cloud computer system 800 may include one or more remote server computers 808.

The remote server computers 808 include any suitable non-transitory computer-readable medium for storing program code 810 (e.g., the intent determination module 121, the preview generator module 122, and the document editing module 123 of FIG. 1) and program data 812, or both, which is used by the cloud computer system 800 for providing the cloud services. A computer-readable medium can include any electronic, optical, magnetic, or other storage device capable of providing a processor with computer-executable instructions or other program code. Non-limiting examples of a computer-executable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the server computers 508 can include volatile memory, non-volatile memory, or a combination thereof.

One or more of the server computers 808 execute the program code 810 that configures one or more processors of the server computers 808 to perform one or more of the operations that determine a global intent 127 for a multi-element canvas 114 and generate previews of replacement multi-element canvases 116 for a multi-element canvas 114. As depicted in the embodiment in FIG. 8, the one or more servers providing the service for determining a global intent 127 for a multi-element canvas 114 and the service for generating previews of replacement multi-element canvases 116 for a multi-element canvas 114 may implement the intent determination module 121, the preview generator module 122, and the document editing module 123. Any other suitable systems or subsystems that perform one or more operations described herein (e.g., one or more development systems for configuring an interactive user interface) can also be implemented by the cloud computer system 800.

In certain embodiments, the cloud computer system 800 may implement the services by executing program code and/or using program data 812, which may be resident in a memory device of the server computers 808 or any suitable computer-readable medium and may be executed by the processors of the server computers 808 or any other suitable processor.

In some embodiments, the program data 812 includes one or more datasets and models described herein. In some embodiments, one or more of data sets, models, and functions are stored in the same memory device. In additional or alternative embodiments, one or more of the programs, data sets, models, and functions described herein are stored in different memory devices accessible via the data network 806.

The cloud computer system 800 also includes a network interface device 814 that enable communications to and from cloud computer system 800. In certain embodiments, the network interface device 814 includes any device or group of devices suitable for establishing a wired or wireless data connection to the data networks 806. Non-limiting examples of the network interface device 814 include an Ethernet network adapter, a modem, and/or the like. The service for determining a global intent 127 for a multi-element canvas 114 and the service for generating previews of replacement multi-element canvases 116 for a multi-element canvas 114 is able to communicate with the user devices 804A, 804B, and 804C via the data network 806 using the network interface device 814.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied— for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method, comprising:
   accessing a multi-element document, the multi-element document including a plurality of elements depicted in the multi-element document;
   determining a global intent for the multi-element document based on the plurality of elements depicted in the multi-element document, wherein determining the global intent for the multi-element document comprises:
      determining, for each of the plurality of elements, an element-specific topic distribution comprising a ranked list of topics;
      wherein at least one of the plurality of elements comprises a text element having less than a threshold length, and wherein determining the element-specific topic distribution for each text element having less than the threshold length comprises applying a machine learning model to text associated with the text element to generate the ranked list of topics specific to the text element; and
      creating a first aggregated topic distribution from the determined element-specific topic distributions, wherein the global intent comprises one or more terms from the first aggregated topic distribution;
   selecting, from the plurality of elements, a selected element;
   generating, based on the determined global intent, a replacement multi-element document that includes a substitute element in place of the selected element in the multi-element document, wherein content of the substitute element comprises one or more features that are different from one or more corresponding features of content of the selected element; and
   displaying, via a user interface with the multi-element document, a preview of the replacement multi-element document providing a view of the replacement multi-element document, wherein the view of the replacement multi-element document is focused to depict the substitute element.

2. The method of claim 1, wherein focusing to depict the substitute element comprises zooming the preview to display an area including the substitute element.

3. The method of claim 2, wherein the area including the substitute element does not include elements of the replacement multi-element document other than the substitute element.

4. The method of claim 1, wherein selecting the selected element comprises receiving, via the user interface, a selection of the selected element in the multi-element document.

5. The method of claim 1, wherein selecting the selected element comprises:
   determining an edit history for the plurality of elements describing one or more edits previously applied to the plurality of elements; and
   selecting, based on the edit history, a most-recently edited element from the plurality of elements as the selected element.

6. The method of claim 1, wherein selecting the selected element comprises:
   determining a displayed area of the multi-element document that is displayed via the user interface; and
   selecting an element of the plurality of elements that is encompassed by a displayed area as the selected element.

7. The method of claim 1, wherein the multi-element document comprises a layered canvas and wherein the plurality of elements comprise a plurality of layers.

8. The method of claim 1, wherein the multi-element document comprises a video and wherein the plurality of elements comprise a plurality of keyframes of the video, wherein focusing to depict the substitute element comprises displaying, chronologically, a set of the plurality of keyframes including at least a replacement keyframe.

9. The method of claim 1, wherein the multi-element document comprises an audio clip and wherein the plurality of elements comprise a plurality of portions of the audio clip, wherein focusing to depict the substitute element comprises displaying, chronologically, a set of the plurality of portions of the audio clip including at least a replacement audio portion.

10. The method of claim 1, further comprising:
    generating a second aggregated topic distribution from a subset of the determined element-specific topic distributions, the subset associated with elements in the multi-element document that have been selected or edited by a user; and
    wherein the global intent further comprises one or more terms from the second aggregated topic distribution.

11. The method of claim 1, wherein at least one of the plurality of elements comprises an image element and wherein determining, for each image element of the plurality of elements, the element-specific topic distribution comprising the list of topics comprises:
    extracting, from the image element, one or more tags;
    applying a second machine learning model to the one or more tags to generate a description;
    querying a database using the generated description to retrieve documents, the documents including topic labels; and
    wherein the ranked list of topics comprises a list of topics ranked according to a number of topic labels associated with each topic in the retrieved documents.

12. The method of claim 1, wherein determining, for each text element of the plurality of elements, the element-specific topic distribution comprising the list of topics comprises:
    querying a database using text of the text element to retrieve documents, the documents including topic labels; and
    wherein the ranked list of topics comprises a list of topics ranked according to a number of topic labels associated with each topic in the retrieved documents.

13. The method of claim 1, wherein generating the replacement multi-element document comprises querying a database using the global intent to retrieve the substitute element.

14. The method of claim 13, further comprising:
displaying, via a user interface with the multi-element document, the determined global intent; and
receiving, via the user interface, a modification to the determined global intent, wherein querying the database using the global intent comprises querying the database using the modified global intent.

15. A system comprising:
a memory component; and
a processing device coupled to the memory component, the processing device to perform operations comprising:
accessing a multi-element document, the multi-element document including a plurality of elements depicted in the multi-element document;
determining a global intent for the multi-element document based on the plurality of elements depicted in the multi-element document, wherein determining the global intent for the multi-element document based on the plurality of elements comprises:
determining, for each of the plurality of elements, an element-specific topic distribution comprising a ranked list of topics;
wherein at least one of the plurality of elements comprises a text element having less than a threshold length, and wherein determining the element-specific topic distribution for each text element having less than the threshold length comprises applying a machine learning model to text associated with the text element to generate the ranked list of topics specific to the text element; and
creating a first aggregated topic distribution from the determined element-specific topic distributions, wherein the global intent comprises one or more terms from the first aggregated topic distribution;
selecting, from the plurality of elements, a selected element;
generating, based on the determined global intent, a replacement multi-element document that includes a substitute element in place of the selected element in the multi-element document, wherein content of the substitute element comprises one or more features that are different from one or more corresponding features of content of the selected element; and
displaying, via a user interface with the multi-element document, a preview of the replacement multi-element document providing a view of the replacement multi-element document, wherein the view of the replacement multi-element document is zoomed to comprise an area including the substitute element.

16. The system of claim 15, wherein selecting the selected element comprises receiving, via the user interface, a selection of the selected element in the multi-element document.

17. The system of claim 15, wherein selecting the selected element comprises:
determining an edit history for the plurality of elements describing one or more edits previously applied to the plurality of elements; and
selecting, based on the edit history, a most-recently edited element from the plurality of elements as the selected element.

18. A non-transitory computer-readable medium storing executable instructions, which when executed by a processing device, cause the processing device to perform operations comprising:
accessing a multi-element document, the multi-element document including a plurality of elements depicted in the multi-element document;
determining a global intent for the multi-element document based on the plurality of elements depicted in the multi-element document, wherein determining the global intent for the multi-element document based on the plurality of elements comprises:
determining, for each of the plurality of elements, an element-specific topic distribution comprising a ranked list of topics;
wherein at least one of the plurality of elements comprises a text element having less than a threshold length, and wherein determining the element-specific topic distribution for each text element having less than the threshold length comprises applying a machine learning model to text associated with the text element to generate the ranked list of topics specific to the text element; and
creating a first aggregated topic distribution from the determined element-specific topic distributions, wherein the global intent comprises one or more terms from the first aggregated topic distribution;
selecting, from the plurality of elements depicted in the multi-element document, a selected element;
generating a replacement multi-element document that includes a substitute element in place of the selected element in the multi-element document, wherein content of the substitute element comprises one or more features that are different from one or more corresponding features of content of the selected element; and
displaying, via a user interface with the multi-element document, a preview of the replacement multi-element document providing a view of the replacement multi-element document, wherein the view of the replacement multi-element document is zoomed to comprise an area including the substitute element.

* * * * *